United States Patent
Sankarasubramaniam et al.

(10) Patent No.: US 8,238,665 B2
(45) Date of Patent: Aug. 7, 2012

(54) PROCESSING OF PRINTED DOCUMENTS

(75) Inventors: Yogesh Sankarasubramaniam, Karnataka (IN); Badri Narayanan Ranganathan, Tamil Nadu (IN); Srinivasan Ramani, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 807 days.

(21) Appl. No.: 12/358,260

(22) Filed: Jan. 23, 2009

(65) Prior Publication Data

US 2010/0153843 A1 Jun. 17, 2010

(30) Foreign Application Priority Data

Dec. 11, 2008 (IN) ............................ 3101/CHE/2008

(51) Int. Cl.
*G06K 9/34* (2006.01)
(52) U.S. Cl. ...................... 382/184; 382/171; 382/175
(58) Field of Classification Search .................. 382/184, 382/174, 173, 168, 171, 176, 177, 178, 180, 382/100, 175; 348/239; 250/208.1, 223 R, 250/227.24, 566, 216, 556; 715/234
See application file for complete search history.

(56) References Cited

U.S. PATENT DOCUMENTS

| | | |
|---|---|---|
| 5,663,806 A | 9/1997 | Grise et al. |
| 5,867,633 A * | 2/1999 | Taylor et al. ................... 358/1.9 |
| 5,870,508 A | 2/1999 | Park |
| 6,263,121 B1 | 7/2001 | Melen et al. |
| 6,522,770 B1 | 2/2003 | Seder et al. |
| 6,996,295 B2 | 2/2006 | Tyan et al. |
| 7,131,061 B2 * | 10/2006 | MacLean et al. .............. 715/210 |
| 7,131,776 B2 | 11/2006 | Aoshima et al. |
| 7,373,365 B2 | 5/2008 | Varadarajan et al. |
| 7,796,309 B2 * | 9/2010 | Sadovsky et al. .............. 358/474 |
| 2004/0218069 A1 | 11/2004 | Silverstein |
| 2005/0285761 A1 | 12/2005 | Jancke |
| 2007/0290053 A1 * | 12/2007 | Bov et al. ....................... 235/493 |
| 2008/0008350 A1 | 1/2008 | Mitome |
| 2008/0292136 A1 * | 11/2008 | Ramani et al. ................. 382/100 |
| 2009/0044254 A1 * | 2/2009 | Tian ................................... 726/4 |
| 2009/0059309 A1 * | 3/2009 | Ramani et al. ................. 358/401 |

* cited by examiner

*Primary Examiner* — Sheela Chawan

(57) ABSTRACT

A document processing method comprises adding document markers to predetermined locations of an electronically stored document. These are printed with the document. The document is scanned and the scanned document markers are used to process the scanned image. This processing comprises at least pixel threshold setting, and determination of the locations of the scanned image which are to be processed to derive the pixels of a digital version of the document. This enables local deformations in the paper document to be corrected, and enables correct thresholds for the printing and scanning operations to be applied. The electronically stored document can be processed to derive a set of document properties which can be used when constructing the digital version.

15 Claims, 4 Drawing Sheets

PROCESSING OF PRINTED DOCUMENTS

RELATED APPLICATIONS

Benefit is claimed under 35 U.S.C. 119(a)-(d) to Foreign application Serial No. 3101/CHE/2008 entitled "PROCESSING OF PRINTED DOCUMENTS" by Hewlett-Packard Development Company, L.P., filed on 11 Dec. 2008, which is herein incorporated in its entirety by reference for all purposes.

BACKGROUND OF THE INVENTION

This invention relates to the processing of printed documents. The processing of printed documents is far inferior today, compared with the sophisticated processing possible for electronic documents.

Despite numerous predictions of a 'paperless world', paper documents continue to play a pivotal role in business enterprises and government institutions, and there is a continuing need to process paper documents. As a result, there is often a translation from the digital domain to the paper domain and back from the paper domain (for example after document has been edited or used for verification purposes) to the digital domain.

The transition from the digital domain to the paper domain and back can result in a reduction in quality of the digitally stored image, and furthermore there is the possibility of tampering of documents. Printing and scanning operations can cause severe non-linear distortions, de-localization and low-pass filtering at the pixel level, which are not necessarily visible to the human eye. For example, the printed and scanned image of a paper document can have as high as 10%-30% of the pixels in error, even though visually the document appears similar to the electronic original document image.

There is therefore a need for an improved method and apparatus for processing printed documents.

BRIEF DESCRIPTION OF THE DRAWINGS

Examples of the invention will be described in detail with reference to the accompanying drawings, in which.

DETAILED DESCRIPTION

Examples of the invention provide a method and apparatus in which markers are provided on a printed document. These are used so that when an amended version of the document (for example with manual annotations) is scanned, the markers can be used to ensure that the scanned image is a high quality representation of the printed document, and/or to enable changes to the document to be easily identified. The markers can enable the complete process, from the digital domain to the paper domain and back to the digital domain, to be insensitive to the use of different printers and scanners, because the markers can be used for calibration purposes.

In more detail, examples of the invention provide a document processing method in which document markers are added to predetermined locations of an electronically stored document before printing. The printed document is subsequently scanned to reconstruct a (new) digital image of the document. The document markers are used to provide threshold setting, and also determination of the individual pixel locations of the electronically stored document. This means that distortions can be corrected (for example physical damage of the paper document). In some examples, changes to the document can be identified so that annotations can be identified or fraudulent changes can be spotted.

The description below explains one example of process by which a digital image is printed so that manual annotations can be made in paper form, or the printed paper document can be used as a verification document. After it has been used (for example annotated), the paper document is scanned so that it can be stored digitally. Preferably, the document quality/integrity is preserved/verified at the pixel level.

In the detailed description which follows, a number of abbreviations will be used. These are explained below:

ODI—Original document image. This is a digital representation of a paper document.

MDI—Marked document image. This is a version of the ODI to which markings have been added digitally to enable conservation of image quality and/or enable verification of document authenticity.

CPD—Candidate paper document. This is a paper document which includes manually made annotations, fraudulent modifications or any other changes.

SDI—Scanned document image. This is a scanned version of the CPD.

RDI—Reconstructed document image. This is a processed version of the SDI, which aims to restore the image to the same quality as the ODI.

Figures 1, 2:
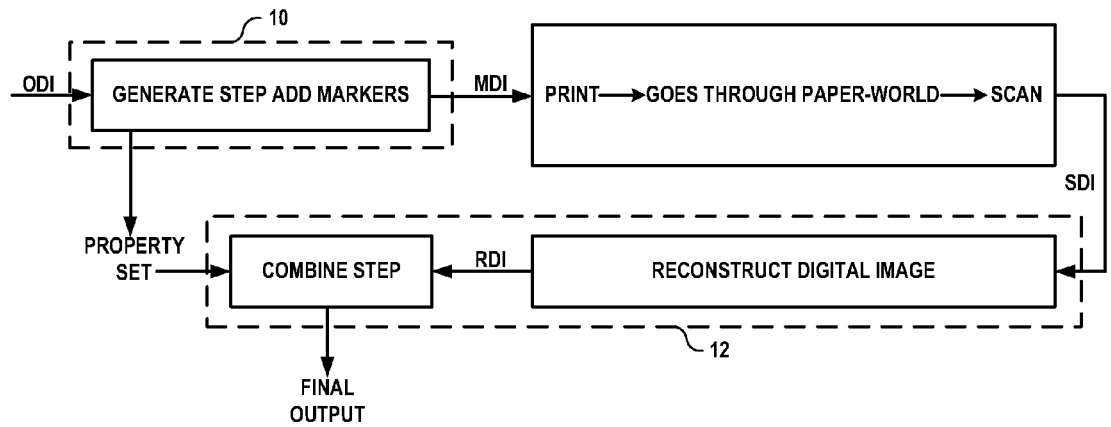
FIG. 1 shows an example embodiment of processing sequence.
FIG. 2 shows an example document which has markers added by the sequence in FIG. 1.

An example of possible process flow is shown in FIG. 1. It consists of two stages, both of which work real-time; a Digital-to-paper stage 10 and a Paper-to-digital stage 12.

The technique treats the electronic original document image (ODI) as an array of pixels, for example a bitmap representation. A property set is computed on the image pixels. This property set is a collection of any suitable functions of the pixels/group of pixels which constitute the image. The property set in one example provides a compressed representation of the pixel properties of the ODI. The reconstructed document image (RDI) is also an array of pixels.

A pixel representation (of the MDI) is the last step before printing the paper document, and also the first step while crossing back into the digital world. This means that the compressed representation of the pixel properties can most effectively be used as a mechanism for ensuring document quality.

In the description below, it is assumed that the ODI and RDI have a binary pixel level (either black (0) or white (1)). The approach can of course be extended to include multiple pixel levels.

The digital-to-paper stage 10 will first be described. This stage processes a digital image representation before the paper version is printed.

The ODI can be assumed to an N×M array of pixels. If required, suitable cropping, smoothening, removal of unwanted data, and other "clean up" operations can be carried out.

In some implementations, a suitable property set of pixels of the ODI is then generated. In examples, this step provides a compressed representation of the image, which takes account of individual pixel values. This compressed representation can be combined with the document image at a later stage to ensure that the properties have not been altered by the processing steps carried out. This is a subsequent "combine" step, described further below. At the extreme, the property set may include the full ODI itself, in which case there is no such compression. Desired attributes of the property set are:

- Properties should be chosen suitably according to the application and processing requirements.
- The property set should have smaller size compared to the ODI (hence reference to compression).
- The generate step and combine step should be simple.

For example, error correcting code (ECC) parities over the ODI pixels could be computed and stored, which could then be retrieved in the paper-to-digital stage 12 for rectifying pixel errors in the RDI. An example choice of suitable properties, generate step, and combine step is discussed in detail below.

One way of computing the property set is as follows. The property set PS is a collection of 'n' properties P1, P2, ... Pn:

$$PS=\{P1, P2, \ldots, Pn\},$$

where a property Pi is computed as follows:

The array of pixels in the ODI is divided into 't' blocks, denoted as ODI1, ODI2, ..., ODIt. Then the property Pi is computed as the following array $$Pi=[Pi\_1 Pi\_2 \ldots Pi\_t]=[fi(ODI1) fi(ODI2) \ldots fi(ODIt)]$$

where fi is a suitable operation chosen according to the application and processing requirements. In the extreme case, the property set could be the entire ODI itself. Thus the present concept of 'property set' includes as a special case the use of the entire ODI for processing. At the other extreme, the property set could also be null/void in cases where no ODI properties are required for the desired processing.

The ODI is then divided into cells. Each cell is a square T×T array of pixels—the cells may be different from the 'blocks' used for defining the property set.

If N and M (the dimensions of the ODI) are not integer multiples of T (the cell dimension), then the ODI can be padded with blank (white) pixels up to the required dimensions.

Figure 3:
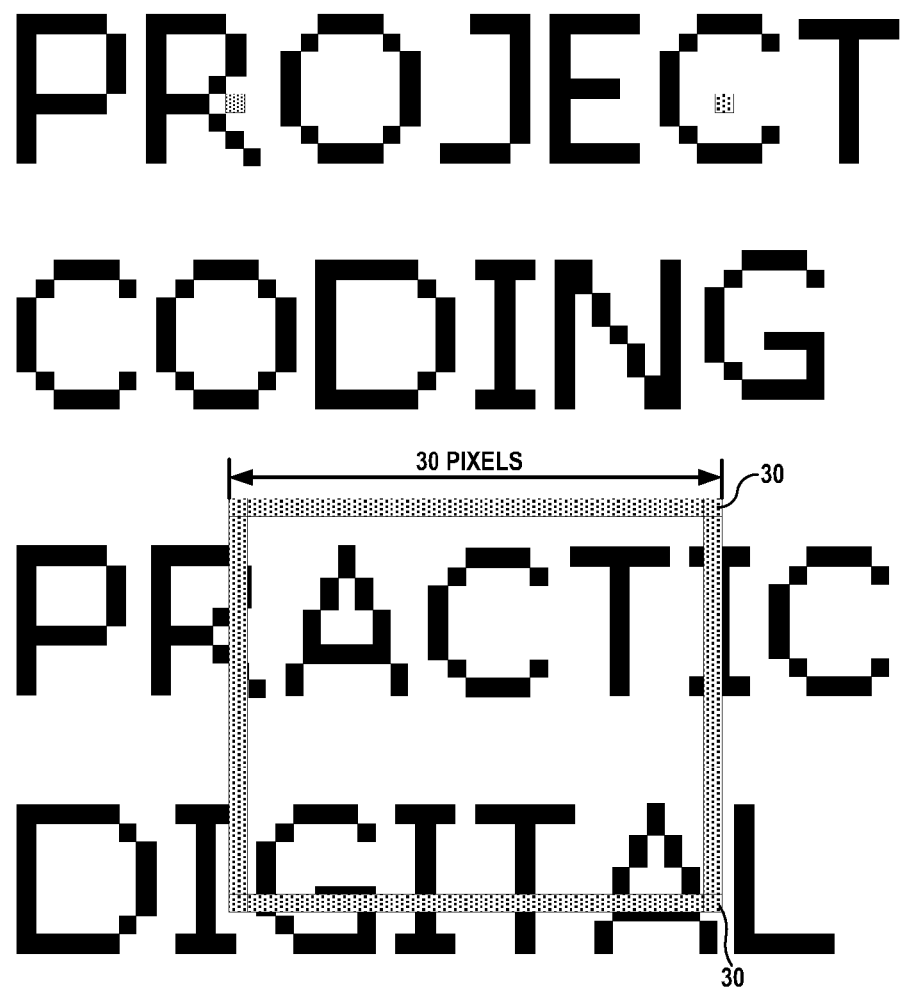
FIG. 3 shows an enlarged portion of the image of FIG. 2.

FIGS. 2 and 3 show an example with N=M=501 pixels and T=30 pixels. FIG. 2 shows the complete MDI as a typical document. FIG. 3 shows an enlarged portion of the MDI to show the pixel resolution. It is noted that the textual content of the document is not relevant to the invention.

In this example, dot markers are added in the digital domain to the cell corners. These are shown as 30 in FIG. 3, and they have a size of 1 pixel. Any suitable scheme can be used for the dot markers. In the example of FIG. 3, the ODI is scaled to an 8-bit representation (black=0 and white=255), and the dot markers are single pixels of grey-value 150. Alternatives for dot markers include using other suitable pixel levels, shapes or any other markers that are visually unobtrusive but easily detected upon scanning.

Corner markers are also added of size C×C pixels on the four corners of the dotmarked ODI. These corner markers are shown as 20 in FIG. 2. In this example, the corner markers have a dimension of 15 pixels square and there is a horizontal and vertical blank space of 5 pixels separating the corner markers 20 from the nearest dot marker 30. The corner markers are specifically designed for auto-calibrating the black, white and dot-marker grey levels. This helps make the solution printer and scanner independent. Furthermore, two different markers can be chosen for the left and right corners to help identify any 90, 180 or 270 degree orientation offsets.

Figure 4:
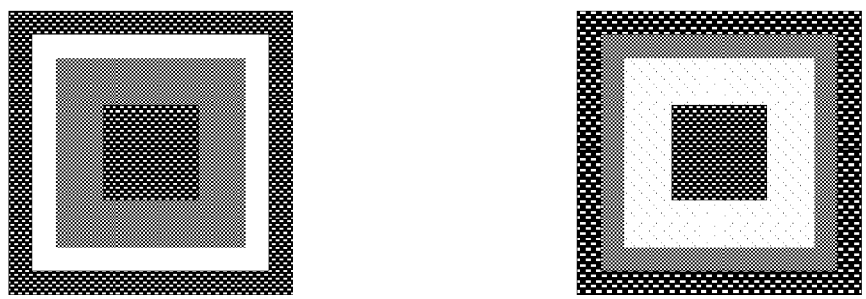
FIG. 4 shows in more detail examples of one of the types of markers of FIG. 2.

A close-up of the left and right corner markers is shown in FIG. 4.

The left corner marker has a black centre, a grey first surround, a white second surround and a black outer surround. The right corner marker has a black centre, a white first surround, a grey second surround and a black outer surround.

The document image at the end of the digital-to-paper stage 10 is the marked document image (MDI). The MDI is then printed (using a suitable resolution printer), and makes its way through the paper world with possible additions, manual edits, modifications, deletions, annotations, wear and tear associated with paper handling and storage such as photocopying, folds, stains, marks, staples, bruises etc. The MDI can also be a form which is filled in by a customer and returned.

When the paper document is ready to cross back into the digital world, it is referred to as the candidate paper document (CPD).

The return-leg of the digital-to-paper-to-digital cycle 10,12 will now be described.

The CPD is scanned using sufficient resolution to distinguish the individual pixels, and thereby identify the corner marker and dot marker levels. For example, 8-bit grey-scale scanning at 300 ppi can be used. The scanned CPD is referred to as the scanned document image (SDI).

Figures 5, 6:
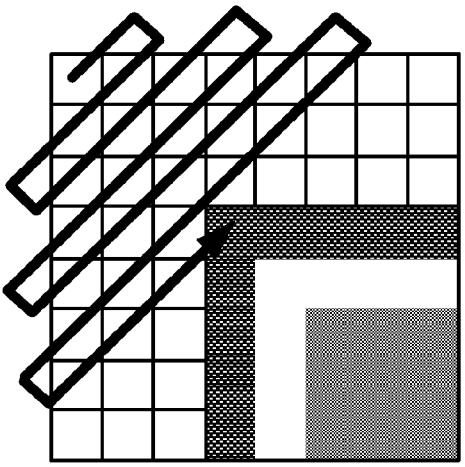
FIG. 5 is used to explain one possible method of finding a marker location.
FIG. 6 shows the document of FIG. 2 and is used to explain how all the markers are located.

The corner markers are located in the SDI. For example, the top left corner marker is detected by starting at the top left corner of the SDI and making a diagonal zig-zag search for the first black pixel. This search process is shown in FIG. 5. This corresponds to the corner black pixel in the corner marker of FIG. 4. Then, additional row, column and other consistency checks are performed to avoid spurious matches. Finally the entire marker pattern from the SDI is matched to the actual marker pattern to confirm the detection of the corner marker. This process is repeated for all four corner markers.

At this stage, any 90, 180, 270 degree orientation mismatches can be caught by virtue of the different left and right markers, and this offset can be rectified.

The three grey levels are calibrated using the corner markers. The corner markers in this example are especially designed to enable calibration of the white, black and dot-marker levels. Since the actual marker pattern is known, statistical data for the SDI corner markers such as histogram, mean, variance and other moments can be collected, which provides a basis for calibration. In one example, suitable detection thresholds can be computed using statistical data. This helps in making the solution printer and scanner independent. The dot markers can also be used for grey level calibration, instead or as well as the corner markers.

The dot markers are also located in the SDI. There are several possible ways of doing this. One approach is described below.

(i) The four dot markers nearest to the four corner markers are first located. These are shown as 60 in FIG. 6 This is done by first computing a coarse location from the previously identified corner marker positions, and then searching a small neighborhood around the coarse location. The searching step fine-tunes the coarse location and helps achieve high precision.

(ii) The other boundary dot markers are then located using the four detected dot markers. These other boundary dot markers are in the regions 62 shown in FIG. 6. Once again a coarse location for each dot marker is computed first, and then fine-tuned by searching its neighborhood. The coarse location is computed using a bilinear transform.

(iii) Finally, the remaining dot markers are located using the boundary dot markers previously identified. A similar two step procedure is adopted.

At the end of these three steps all the dot marker positions are known.

The document image can then be reconstructed by detecting the pixels within each cell using the corresponding dot marker positions. This consists of two steps:

Pixel location synchronization: The corner positions of each T×T cell are known by virtue of the dot marker detection. The individual location of each of the $T^2$ pixels within a cell is then found using a bilinear transform. This process essentially forms a grid based on the dot marker positions. This means that even if the dot markers no longer define a square, the individual pixels can still be identified so that the original shape of the document can be reconstructed. Thus, the dot markers enable local distortions in the paper document to be corrected. Thus, the dot markers are used to determine the locations of the scanned document which are to be processed to derive the pixels of a digital image of the document. This means that the pixel positions are not necessary assigned to the scanned document as a regular grid of positions.

Each of the T×T pixels is then classified into one of the pixel levels—white or black for this example. Of course, for a grey scale or colour application, grey scales or colours would be allocated to the pixels.

For the simpler binary application, a hard-decision detection using bilinear interpolation can be carried out, and the threshold determined in the autocalibration can be used.

The pixel values for the dot marker locations are estimated using a simple prediction algorithm that uses the contextual neighbourhood. This means the dot markers are removed from the image, so that the reconstructed image (RDI) has had the dot markers removed.

Thus, all the pixels are detected and the reconstructed document image (RDI) is obtained.

Although the process has provided reshaping of the image, as well as calibration of the black, white and grey levels, the RDI may still contain pixel errors.

In order to correct these errors, the property set can be used, in examples which use a property set.

The stored property set is retrieved, and the paper document is processed by suitably 'combining' the property set with the RDI. The method of combining the property set with the RDI is chosen suitably according to the application and processing requirements.

For example, if ECC parities were used as a property in the digital-to-paper stage 10, then the corresponding decoding can be performed to rectify some/all of the remaining pixel errors.

The combine step for one embodiment is described below in the context of the system being used for modification identification for paper documents. Important documents such as transcripts, certificates and records continue to be maintained in paper form. This makes them vulnerable to forgery, fraud and manipulation. Often, the veracity of these paper records needs to be remotely ascertained. The remote verifier does not have access to the original untampered record either in paper or electronic form. In such a case, the technique can be used to ascertain the content integrity of the paper record.

Prior to issuing the paper record, the ODI is marked and property set computed as described above. The marked document image (MDI) is then printed and issued as a paper record (e.g. FIG. 3).

The property set can be stored in any one of several methods which allow retrieval at the verifying terminal.

The property set for this example is computed as follows:

$$PS=\{P1,P2\}$$

where P1 and P2 are the two properties.

For computing P1, the ODI is divided into square blocks of 3×3 pixels. Since each pixel is binary (either white (1) or black (0)), each block can be viewed as a symbol over Galois Field GF(512). The blocks are then spatially interleaved and fed into a systematic (511,411) Reed-Solomon (RS) encoder. Thus, the RS encoder outputs 100 parities for each set of 411 input blocks. The entire array of parities forms the property P1.

For computing P2, the ODI is divided into square blocks of 30×30 pixels. Each block can now be viewed as 100 GF(512) symbols. Once again the blocks are suitably interleaved and now fed in to a systematic (420,400) RS encoder. In this case, the RS encoder outputs 20 parities for each set of 4 input blocks. As before, the entire array of parities forms P2.

With the above-described P1 and P2, the total size of PS is around 30% of the ODI size.

Figure 7:
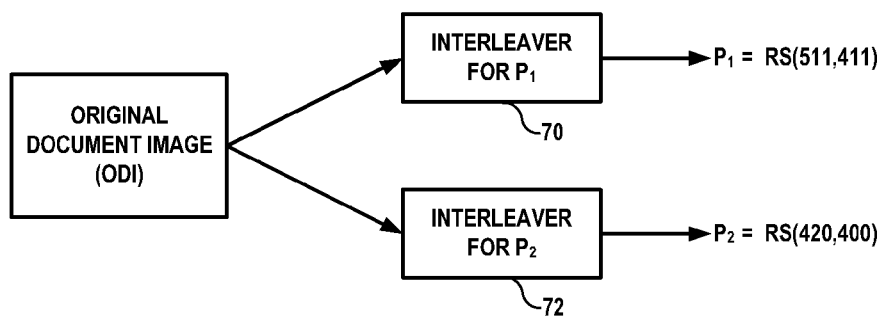
FIG. 7 is an example of processing applied to an original image to derive a property set used in the process of FIG. 1.

P1 and P2 are computed from the ODI in a parallel fashion as shown in FIG. 7. Interleaver 70 is used in the computation of P1, and interleaver 72 is used in the computation of P2.

These properties P1 and P2 are chosen in this example to identify modifications or tampers made to the paper record. The interleavers are used to combat spatially contiguous modifications by effectively dispersing them for the decoding in the combine step.

At the verification terminal, the candidate paper document (CPD) is scanned, and the reconstruction proceeds as described for the paper-to-digital stage 12, to derive the reconstructed document image (RDI).

Figure 8:
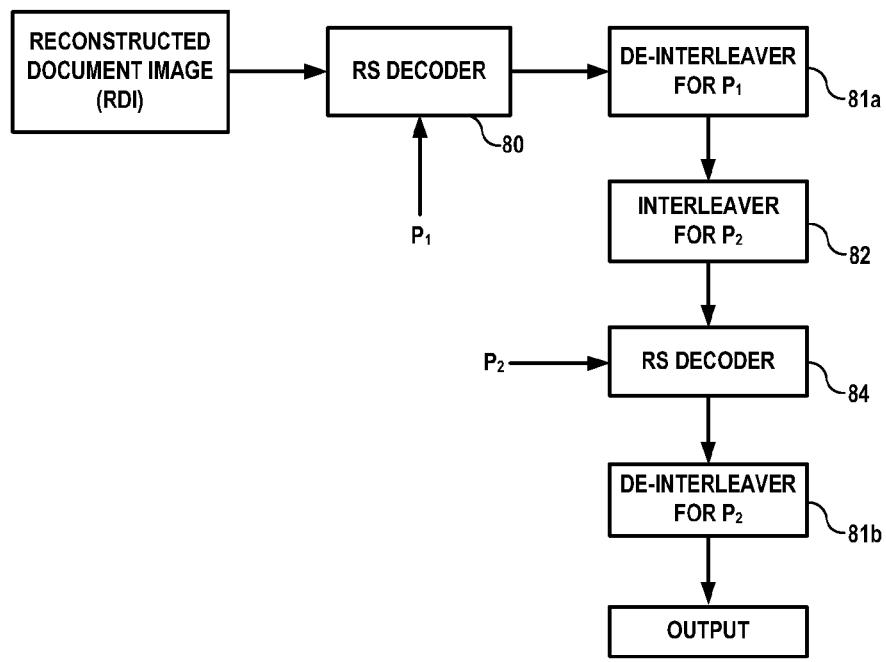
FIG. 8 is used to explain how the property set is subsequently used.

In the combine step, the property set is retrieved and combined with the RDI using a concatenated decoding procedure shown in FIG. 8.

The RDI is first decoded using a standard RS decoding procedure with property P1 as the parities. The decoder 80 corresponds to the (511,411) systematic RS code. The output of the first RS decoder is then fed into the (420,400) RS decoder 84 with P2 as the parities. Appropriate de-interleaving (81*a*, 81*b*) and interleaving 82 is carried out at each stage.

The output of the concatenated decoding stage is the verified document image (VDI). The difference between the verified document image (VDI) and RDI indicates the alterations which the paper record has undergone.

For the current application, where the verifier is interested in tracking the modifications, a color coding scheme can be used to display the output. An image incorporating the color coding scheme provides a Color Coded Output (CCO). A human verifier then looks at the CCO and ascertains whether the indicated modifications are malicious or inadvertent, and accordingly makes his/her decision on the veracity of the paper record.

One example illustrative of many possible color coding schemes is as follows:

A pixel in the colour coded output image is marked:
Yellow—if the pixel value is the same in the verified document image (VDI) as well as the RDI.
Blue—if the pixel value was white in the VDI and black in the RDI (indicating addition of content).
Red—if the pixel value was black in the VDI and white in the RDI (indicating deletion of content).

This approach can detect even if only a few pixels are added, for example changing a "3" to an "8". A very small fraction of random pixel errors could remain in the CCO image. In such a case, the human verifier can use discretion to easily distinguish between the random errors and malicious modifications.

The technique has been tested across different ODIs (with various font sizes, generation software, ODI sizes etc.), printers, scanners, and various paper-world artifacts due to folds, stains, tears, marks, staple, annotations, manual edits, photocopying etc.

The raw pixel error rate (PER) is defined as the fraction of erroneous pixels in the final RDI. PERs for various printer and scanner combinations are listed in Table 1 below. If desired, the raw PER can be further reduced using other suitable properties, processing techniques and/or multiple scans.

TABLE 1

| Printer | Scanner | | | |
| --- | --- | --- | --- | --- |
| | HP Scanjet 2400 | HP Photosmart 3310AIO | HP Scanjet 4670 | HP Scanjet 8250 |
| HP Laserjet 9040 | 0.003 | 0.006 | .0004 | 0.004 |
| HP Color Laserjet 2550 | 0.02 | 0.008 | 0.03 | 0.06 |
| HP Color Inkjet 1700 | 0.03 | 0.009 | 0.05 | 0.05 |

The technique enables blind reconstruction, i.e., it does not require the original electronic copy for reconstruction in the paper-to-digital stage. As a result, the technique can be used even if the electronic copy is unavailable (as in processing by a third party having no links to the originator of the document) or inaccessible (e.g. due to security constraints, querying delays), or if the received paper document is known to significantly differ from the electronic original (in case of form-filling, manual edits etc.).

The technique treats both the ODI and RDI as an array of pixels, and also uses only functions of pixels of the digital image. Thus by working at the pixel level, the solution is font, software and graphics independent. As a result, candidate paper documents (CPDs) can be processed long after the software, font and graphics have fallen out of use. Furthermore, pixel level processing enables many current applications to be extended which exist in the digital-world to the paper-world, and also potentially open up newer opportunities in the future.

An example of this is the modification identification solution discussed above, where nontextual/graphical content could also be protected, and even slight modifications of a few pixels (that could significantly alter the meaning of the paper record) could be caught.

The technique can achieve pixel-level high-precision document image reconstruction. The raw pixel error rate is as low as 0.003. Such pixel-level precision is usually not required for acceptable visual appearance, but is critical for subsequent processing using the property set in the combine step.

In the example above, the corner markers serve a dual purpose—they offer coarse location for the dot markers, and they also help auto-calibrate the various pixel and dot-marker levels. Such an auto-calibration enables the disclosed technique to work across printers and scanners. Furthermore, the use of different left and right markers can detect and correct any 90, 180 or 270 degree scanning orientation offsets. The dot markers can also be chosen to be unobtrusive to the paper world, and help achieve high reconstruction accuracy.

Using sufficiently robust corner and dot markers, the technique can be independent of changes caused by additions, deletions, manual edits, annotations, wear and tear associated with paper handling and storage such as photocopying, folds, tear, stains, marks, staple etc.

The technique can be used in several applications such as enterprise workflow processing, remote validation of printed records, form-filling, annotation extraction, and any other digital-to-paper-to-digital cycle which requires high fidelity.

The technique is also compatible with existing paper documents which do not have an electronic counterpart. A scan of the paper document can act as the ODI in such a case.

Figure 9:
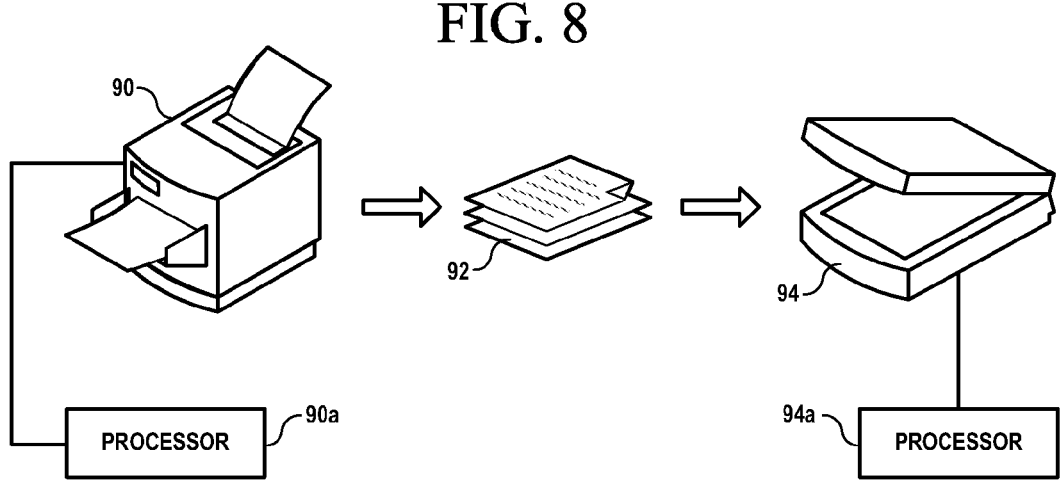
FIG. 9 shows in schematic form an example of document processing system.

FIG. 9 shows in schematic form an example of system for implementing the method described above. The system is a document processing system, and comprises a printer 90 which provides the paper document 92 to which the document markers are added. A processor 90a associated with the printer 90 generates and adds the document markers. The processor is of course in practice an integrated part of the printer. The additional required functionality can simply be implemented as a software upgrade to the printer, on its conventional processor. The system also includes a scanner 94; for processing scanned document files, and which is adapted to process the document markers in the manner explained above. Again a processor 94a is shown associated with the scanner 94 but this will be an integrated part of the scanner. The printer and scanner can also be a single multifunction device.

Some examples of uses of the system have been mentioned above, and these are now elaborated.

Enterprise and SMB workflows can use the approach. Paper continues to thrive in digital organizations—for instance, paper communication between organizations, or between organizations and their customers. Frequent digital-to-paper and paper-to-digital transitions are a feature of such workflows. In such a scenario, the technique can be used for efficient downstream processing of printed documents—first to reconstruct a high-fidelity digital image of the paper document; and second, to efficiently process this reconstructed digital image using suitable functions of the ODI pixels.

The first step is especially important in cases where the ODI is either unavailable (as in processing by a third party having no links to the originator of the document) or inaccessible (for e.g. due to security constraints, querying delays).

In form-filling and annotation extraction, the technique can be used even when the ODI is available, especially in cases where the paper document has been significantly edited/altered after printing. This is true for form-filling, manual edits, annotations etc. The technique can be used to first reconstruct the digital image of the filled/edited form to a high pixel-level precision. Then the reconstructed digital image can be 'differenced' with the ODI to extract the filled-in data.

In the example above a specific set of document markers has been described, with corner markers enabling grey scale setting for the scanning operation (to provide correct function across printer and scanner types) and dot markers to provide pixel positioning. However, different marker designs can be used. For example, the dot markers may be formed as any regular grid of lines or points (for example a hexagonal grid, or orthogonal lines). The markers should have minimal impact on the document for the (human) user, but provide have sufficient density of markings that local deformations in the paper document can be corrected, by defining the individual pixel positions. By working at the pixel level, the technique can be independent of fonts, graphics, and software used to create the electronic original document image (ODI). The markers do not however require dimensions of only one pixel.

In the example above, the property set is used either to correct errors which have arisen or to enable changes to be highlighted. The use of the property set for an image eliminates the need for storing the entire image itself. The size of the property set is governed by the type of application and desired processing. For the example above, it is sufficient to store only 30% of the ODI size. However, the use of the property set is not essential to the invention. The use of markers alone provides the advantages of correct functioning (i.e. auto-calibration) for different scanners and printers and the ability to correct for deformation of the paper document as well as inadvertent rotation in the re-scan. These advantages alone will be sufficient in many examples, and the additional security and pixel-level image correction functions will not be required.

An example has been given of how to locate the markers, but many alternatives will be immediately apparent to those skilled in the art. For example, the markers may be a specific colour which is not permitted as part of the document content. This is easily achieved for documents which are stored in black and white. The specific arrangement described of corner markers and dot markers in any array is only example of how to use markers for calibration purposes and for dividing the document into cells. The division of the document into portions (cells) for deriving a set of document properties can also be implemented in many different ways.

If a property set is to be used, to enable document differences to be identified, a variety of functions can be used. Essentially these are compression functions, although at the limit the property could be data of the full image. Thus, the document properties can take many different forms, not only EEC parities as explained above.

The steps of adding markers, and subsequently processing markers to control the construction of the digital document will be implemented by a computer program which is running on a control system which implements the method. The control system controls the (i) printing operation, and (ii) the scanning and document construction operation. These two parts of the process can take place at separate locations, and using different computers, but which together combine to implement the overall method.

Various other modifications will be apparent to those skilled in the art.

We claim:

1. A document processing method, comprising:
    adding document markers to predetermined locations of an electronically stored document;
    printing the document to generate a paper version of the document with the document markers;
    scanning the paper version of the document;
    using the scanned document markers to process the scanned image, wherein the processing comprises at least pixel threshold setting, and determination of the locations of the scanned image which are to be processed to derive the pixels of a digital image of the document; and
    constructing a digital version of the paper document.

2. A method as claimed in claim 1, wherein the processing comprises any required image rotation.

3. A method as claimed in claim 1, further comprising:
    processing the electronically stored document to derive a set of document properties, and wherein constructing the digital version comprises comparing the digital image with the previously derived document properties.

4. A method as claimed in claim 3, wherein after comparing the digital image with the previously derived document properties, the differences are highlighted in the constructed digital document.

5. A method as claimed in claim 3, wherein after comparing the digital image with the previously derived document properties, corrections are made to the constructed digital document.

6. A method as claimed in claim 1, wherein the document markers are added before release of a secure document to a user.

7. A method as claimed in claim 1, wherein the document markers comprise four corner markers.

8. A method as claimed in claim 7, wherein the four corner markers include black, white and intermediate pixel levels.

9. A method as claimed in claim 1, wherein the document markers comprise markers forming a regular array across the document.

10. A document scanning method, comprising:
    receiving a scanned document, wherein the document comprises document content and markers over the document content;
    using the scanned document markers to process the scanned image, wherein the processing comprises at least pixel threshold setting, and determination of locations of the scanned image which are to be processed to derive the pixels of a digital image of the document; and
    constructing a digital version of the scanned document.

11. A method as claimed in claim 10, wherein constructing the digital version comprises comparing the scanned image with previously derived document properties which relate to the document.

12. A method as claimed in claim 11, wherein after comparing the scanned image with the previously derived document properties, the differences are highlighted in the constructed digital version.

13. A method as claimed in claim 11, wherein after comparing the scanned image with the previously derived document properties, corrections are made when forming the constructed digital version.

14. A method as claimed in claim 10, wherein using the scanned document markers comprises determining the threshold setting from corner markers which include black, white and intermediate pixel levels, and the location determination is determined from markers forming a regular array across the document.

15. A document processing system, comprising:
    a processor to receive a scanned document, wherein the scanned document comprises document markers at different locations in the document, and the processor is to process the document markers to provide at least pixel threshold setting, and to determine locations of the scanned document which are to be processed to derive pixels of a digital image of the document.

* * * * *